(12) United States Patent
Aiello et al.

(10) Patent No.: US 7,758,246 B2
(45) Date of Patent: Jul. 20, 2010

(54) AIR PURGING FOR A FLUID DYNAMIC BEARING

(75) Inventors: Anthony J. Aiello, Santa Cruz, CA (US); Christopher M. Woldemar, Santa Cruz, CA (US); Norbert S. Parsoneault, Scotts Valley, CA (US); Alan L. Grantz, Aptos, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 239 days.

(21) Appl. No.: 11/821,900

(22) Filed: Jun. 25, 2007

(65) Prior Publication Data

US 2008/0317392 A1  Dec. 25, 2008

(51) Int. Cl.
  *F16C 32/06* (2006.01)
  *G11B 17/04* (2006.01)
  *G11B 17/02* (2006.01)
(52) U.S. Cl. .................. 384/107; 360/99.07; 360/99.08
(58) Field of Classification Search .................. 384/100, 384/107, 112, 113, 114, 115, 121, 123; 360/99.07, 360/99.08
See application file for complete search history.

(56) References Cited

U.S. PATENT DOCUMENTS

| | | | | |
|---|---|---|---|---|
| 6,900,567 B2 * | 5/2005 | Aiello et al. | ................. | 310/90 |
| 6,939,047 B2 * | 9/2005 | Gomyo et al. | ............... | 384/107 |
| 7,134,792 B2 * | 11/2006 | Aiello et al. | ................. | 384/107 |
| 7,201,517 B2 * | 4/2007 | Gomyo et al. | ............... | 384/107 |
| 7,290,934 B2 | 11/2007 | Nishimura et al. | | |
| 7,391,139 B2 * | 6/2008 | Yamamoto | ................. | 310/90 |
| 2003/0091250 A1 * | 5/2003 | Gomyo | ................. | 384/107 |
| 2003/0231813 A1 * | 12/2003 | Gomyo et al. | ............... | 384/107 |
| 2004/0013331 A1 * | 1/2004 | Gomyo et al. | ............... | 384/107 |
| 2004/0091187 A1 * | 5/2004 | Aiello et al. | ................. | 384/112 |
| 2005/0207060 A1 | 9/2005 | Leblanc et al. | | |
| 2006/0039634 A1 * | 2/2006 | Ichiyama | ................. | 384/100 |
| 2006/0039636 A1 * | 2/2006 | Ichiyama | ................. | 384/107 |
| 2006/0051001 A1 * | 3/2006 | Nishimura et al. | ............ | 384/100 |
| 2006/0070238 A1 * | 4/2006 | Gomyo et al. | ............ | 29/898.12 |
| 2006/0083450 A1 * | 4/2006 | Sekii et al. | ................. | 384/100 |
| 2006/0284504 A1 * | 12/2006 | Aiello et al. | ................. | 310/90 |
| 2007/0071376 A1 * | 3/2007 | Lim | ................. | 384/107 |
| 2007/0092172 A1 * | 4/2007 | Obara et al. | ................. | 384/107 |
| 2008/0056104 A1 | 3/2008 | Nishimura et al. | | |
| 2008/0187257 A1 * | 8/2008 | Engesser et al. | ............ | 384/107 |

* cited by examiner

*Primary Examiner*—Thomas R Hannon
*Assistant Examiner*—Phillip A Johnson

(57) ABSTRACT

A robust spindle motor is provided having improved shock resistance for fluid containment, as well as enhanced air purging characteristics. In an aspect, axial displacement of relatively rotating components is restricted by utilizing a limiter situated adjacent to a limiter bushing forming an axial limiter gap therebetween. A fluid channel, at least partially diverging, extends from a hydrodynamic bearing to the axial limiter gap, and continues to a region beyond the axial limiter gap. In an aspect, an axially diverging slot is situated adjacent to the axial limiter gap. Power is reduced by reducing viscous drag between relatively rotating components, hydrodynamic bearing length is increased, and higher stiffness of the hydrodynamic bearing is provided. Fluid volume may be increased, thereby offsetting fluid evaporation losses and allowing for the use of lower viscosity lubricants.

16 Claims, 6 Drawing Sheets

AIR PURGING FOR A FLUID DYNAMIC BEARING

BACKGROUND

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to large magnitudes of mechanical shock as a result of handling. As such, performance and design needs have intensified including improved resistance to a shock event, improved robustness and reduced power consumption.

Disc drive memory systems store digital information that is recorded on concentric tracks of a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft. The read/write heads must be accurately aligned with the storage tracks on the disc to ensure the proper reading and writing of information.

A demand exists for increased storage capacity and smaller disc drives, which has led to the design of higher recording areal density such that the read/write heads are placed increasingly closer to the disc surface. Because rotational accuracy is critical, disc drives currently utilize a spindle motor having fluid dynamic bearings (FDB) between a shaft and sleeve to support a hub and the disc for rotation. In a hydrodynamic bearing, a lubricating fluid provides a bearing surface between a fixed member and a rotating member of the disc drive. Hydrodynamic bearings, however, suffer from sensitivity to external loads or mechanical shock. Fluid can in some cases be jarred out of the bearing by shock events. An embodiment of a FDB motor includes a magnetically biased motor wherein the bearing design cooperates with a magnetically biased circuit or element to establish and maintain fluid pressure in the bearing areas by providing an axial magnetic force, especially in designs where the thrust bearing is defined in the gap at the end of the shaft. Typically in such systems, however, the only force or structure holding the rotating portion of the motor in place is the axial magnetic force; therefore, if shock axial forces exceed magnetic forces in the motor, the rotor can shift and the disk drive can become damaged or fail. Accordingly, FDB spindle motors, and particular, those having electromagnetic bias and a single thrust bearing, generally include features to limit the axial displacement of the rotating portions relative to the stationary portions during a shock event. Often such features are referred to as a "shock limiter." A limiter generally limits or reduces the potential for axial displacements of the rotating portions of the motor relative to stationary portions beyond a desired or acceptable range of axial motion.

The hydrodynamic bearing life of motors used in disc drives is limited by lubricant evaporation. A sufficient amount of lubricant such as oil must be maintained in a capillary seal reservoir to offset evaporation losses. The evaporation rate is further accelerated when special low viscosity oils are used to reduce power. The lower viscosity oils generally have a higher rate of evaporation. If a shock event occurs with a motor having an insufficient volume of lubricant, rotating surfaces may come in direct contact with stationary portions. The dry surface-to-surface contact may lead to particle generation or gall and lock-up of the motor during contact. Particle generation and contamination of the bearing fluid may also result in reduced performance or failure of the spindle motor or disc drive components.

Additionally, the maximum amount of oil that can be filled in the capillary seal is limited by shock requirements, since oil tends to shift and leak out of the seal when shocked. In addition to maintaining a sufficient amount of oil in the seal reservoir to account for evaporation losses, the minimum amount of oil that can be filled in the capillary seal must generally also account for cold temperature contraction of the oil, fill process tolerances, and the volume of oil that recedes into the motor bearing cavities when the axial play gap opens. The requirement of accounting for the axial play volume is intended to avoid allowing the seal meniscus from receding into the motor and trapping air inside the bearing where it poses a reliability risk. Also, as axial height of spindle motors is reduced, the spacing between bearing components decreases, thereby minimizing angular or rocking stiffness of the bearings. As hydrodynamic bearing motor requirements call for lower power, higher stiffness and longer life, there is a need for a capillary seal and an axial limiter design that purges air and reduces power while enabling higher stiffness and longer life.

SUMMARY

The present invention limits axial displacement of relatively rotating components for a hydrodynamic bearing motor, and thus can provide a benefit to mobile hard disk drive applications or other disk drive applications that experience shock events. The invention also provides for purging of air from fluid within the hydrodynamic bearing or throughout fluid containing channels connected thereto, the air being generated from outside the spindle motor or generated internal to the bearing due to negative pressure in the lubricant that pulls air out of solution. The present invention also purges air that may be pulled into the motor bearing cavities and become entrapped when fluid recedes into the motor during events including shock events, assembly and handling.

In an embodiment, power is reduced by reducing viscous drag between relatively rotating components. Increased bearing length and higher stiffness of the bearing is provided, thereby improving bearing performance. In an embodiment, the fluid volume within the motor may be increased, thereby offsetting fluid evaporation losses, and allowing lower viscosity lubricants to be utilized. Hydrodynamic bearing life (i.e., journal bearing, thrust bearing or conical bearing) may thus be extended.

Features of the invention are achieved in part by utilizing a limiter to restrict axial displacement of relatively rotating components. The limiter is situated adjacent to a limiter bushing defining an axial limiter gap therebetween for limiting axial movement of an inner component with respect to an outer component. The limiter is fixed to either the inner component or the outer component, and the limiter bushing is affixed to either the inner component or the outer component, wherein the limiter and the limiter bushing are relatively rotatable.

In an embodiment, a fluid channel extends from a hydrodynamic bearing to the axial limiter gap and continues to a region beyond the axial limiter gap. At least a portion of the fluid channel diverges as the fluid channel extends from the hydrodynamic bearing toward the region that is beyond the axial limiter gap. In an embodiment, the fluid channel diverges and subsequently includes a constant width, as the fluid channel extends toward the region beyond the axial limiter gap. In another embodiment, the fluid channel includes a constant width and subsequently diverges, as the fluid channel extends toward the region beyond the axial limiter gap.

In an embodiment, at least one air purging slot is situated adjacent to the axial limiter gap. The slot is formed in either the limiter or the limiter bushing, or in both the limiter and the limiter bushing. In an embodiment, the slot is has an axially diverging depth shaped in a direction as the fluid channel extends toward the region beyond the axial limiter gap. In an embodiment, the slot has a depth in the range of 80 microns to 200 microns.

The fluid within the motor includes a meniscus contained by a capillary seal. In an embodiment, the region beyond the axial limiter gap forms a fluid reservoir. In an embodiment, one of the inner component and the outer component further defines a fluid recirculation passageway therethrough for recirculating fluid about the hydrodynamic bearing, the fluid recirculation channel being in fluid communication with the fluid channel.

These and various other features and advantages of this invention will be apparent to a person of skill in the art who studies the following detailed description. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method are described herein for limiting axial displacement of relatively rotating components for a hydrodynamic bearing motor, and thus can provide a benefit to mobile hard disk drive applications or other disk drive applications that experience shock events. The invention also provides for purging of air from fluid within the hydrodynamic bearing or throughout fluid containing channels connected thereto, the air being generated from outside the spindle motor or generated internal to the bearing due to negative pressure in the lubricant that pulls air out of solution. The present invention also purges air that may be pulled into the motor bearing cavities and become entrapped when fluid recedes into the motor. Additionally, in an embodiment, power is reduced by reducing viscous drag between relatively rotating components. Increased hydrodynamic bearing length and higher stiffness of the hydrodynamic bearing is provided, thereby improving bearing performance. In an embodiment, the fluid volume within the motor may be increased, thereby offsetting fluid evaporation losses, and allowing lower viscosity lubricants to be utilized. Hydrodynamic bearing life (i.e., journal bearing, thrust bearing or conical bearing) may thus be extended.

It will be apparent that features of the discussion and claims may be utilized with disc drives, low profile disc drive memory systems, spindle motors, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 460 of shaft 402 shown in FIG. 8A infra), and "radially" or "radial direction" refers to a direction perpendicular to the centerline length of the shaft 402. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

Figure 1:
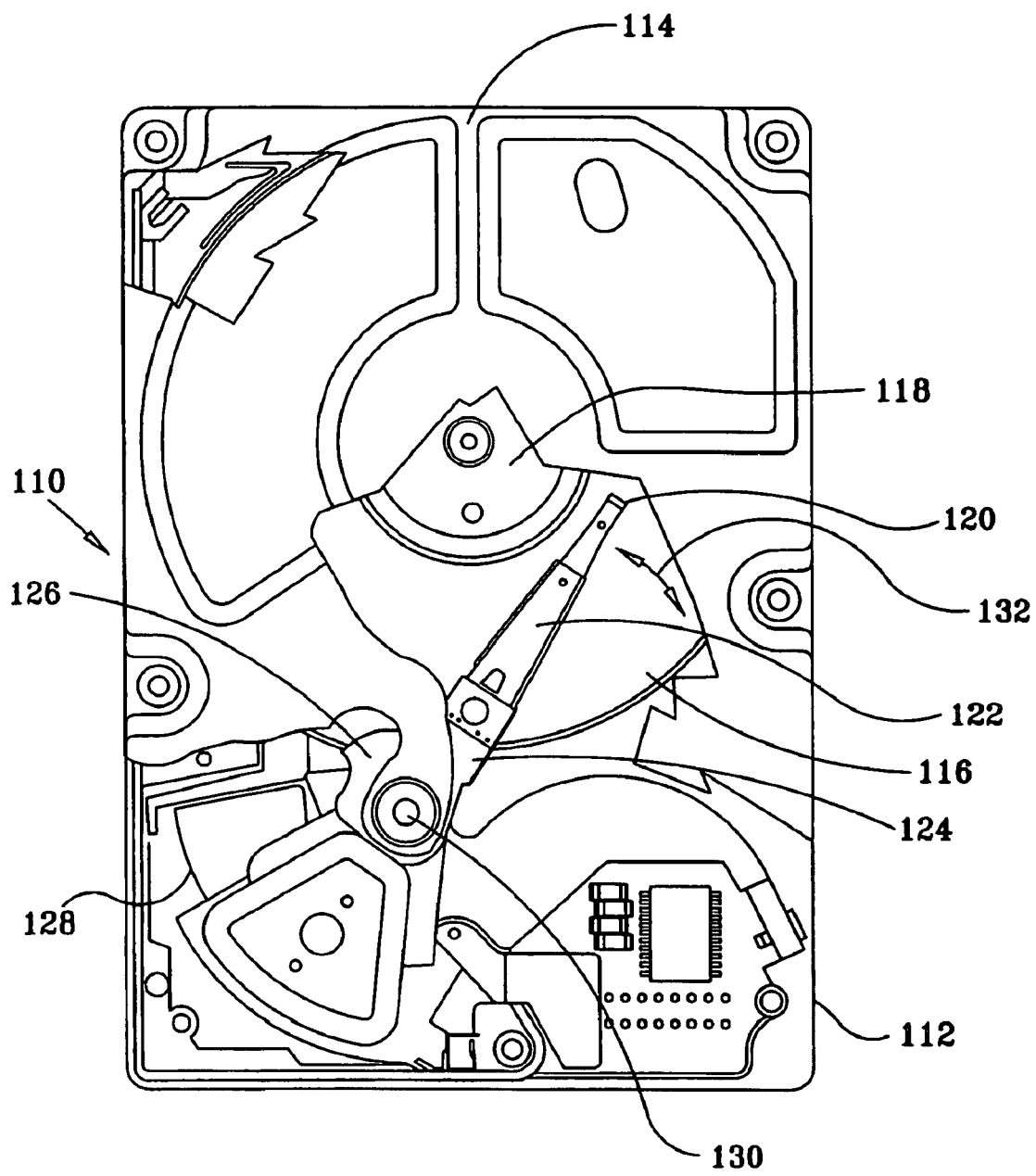
FIG. 1 is a top plan view of a disc drive data storage system in which the present invention is useful, in accordance with an embodiment of the present invention.

Referring to the drawings wherein identical reference numerals denote the same elements throughout the various views, FIG. 1 illustrates a top plan view of a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2 infra) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
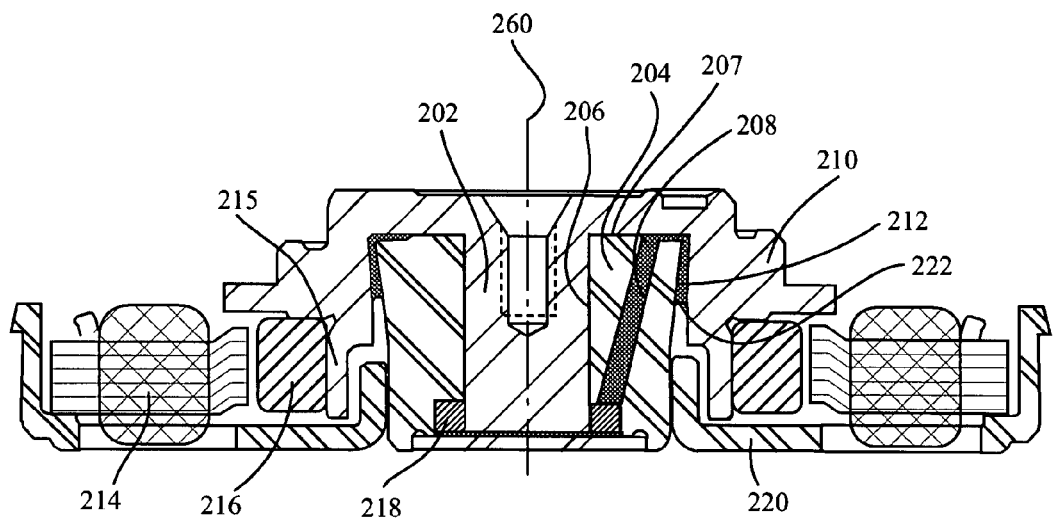
FIG. 2 is a sectional side view of a previously known hydrodynamic bearing spindle motor used in a disc drive data storage system incorporating a shock limiter ring attached to the bottom end of the journal shaft.

Referring to FIG. 2, a sectional side view is illustrated of a contemporary hydrodynamic bearing spindle motor as used in a disc drive data storage system 110. In this example, a shock limiter ring 218 is attached to the bottom end of the shaft 202. The spindle motor includes a stationary component and a rotatable component that is relatively rotatable about the stationary component, defining a journal bearing 206 therebetween. In this example, the rotatable components include shaft 202 and hub 210. Hub 210 includes a disc carrier member, which supports disc pack 116 (shown in FIG. 1) for rotation about shaft 202. Shaft 202 and hub 210 additionally are affixed to backiron 215 and magnet 216. One or more magnets 216 are attached to a periphery of backiron 215. The magnets 216 interact with a stator winding 214 attached to the base 220 to cause the hub 210 to rotate. Magnet 216 can be formed as a unitary, annular ring or can be formed of a plurality of individual magnets that are spaced about the periphery of hub 210. Magnet 216 is magnetized to form one or more magnetic poles. The stationary components include sleeve 204 and stator 214, which are affixed to base plate 220. A fluid dynamic journal bearing 206 is established between the sleeve 204 and the rotating shaft 202.

A fluid, such as lubricating oil or a ferromagnetic fluid fills interfacial regions between shaft 202 and sleeve 204 as well as between other stationary and rotatable components. While the present figure is described herein with a lubricating fluid, those skilled in the art will appreciate that useable fluids include a lubricating liquid or a combination of a lubricating liquid and lubricating gas. Also, typically one of shaft 202 and sleeve 204 includes sections of pressure generating grooves, including asymmetric grooves and symmetric grooves. Asymmetric grooves and symmetric grooves may have a pattern including one of a herringbone pattern and a sinusoidal pattern inducing fluid flow in the interfacial region and generating a localized region of dynamic high pressure and radial stiffness. As shaft 202 rotates, pressure is built up in each of its grooved regions and shaft 202 supports hub 210 for constant rotation. A fluid recirculation path 208 is additionally formed through sleeve 204 to pass and recirculate fluid through journal bearing 206, and also to facilitate purging air from journal bearing 206 via reservoir 212 contained on an end by seal meniscus 222.

Again, in the example illustrated in FIG. 2, a shock limiter ring 218 is attached to the bottom end of the shaft 202. The axial length of the journal bearing 206 is consequently limited by the axial area occupied by the limiter ring 218. This presents a shortcoming in that it is instead desirable to maximize the length of the bearing in order to improve angular stiffness. In hard disk drive motors used in high mobility applications that run on battery power, single thrust bearing motors that are magnetically biased are employed for their high stiffness-to-power ratio. For particularly challenging mobility applications, it is desirable to ensure the maximum amount of journal bearing length possible to improve angular stiffness. In some cases, this has led to the use of a shock limiter configuration located outboard of a thrust bearing (i.e., thrust bearing 207) in place of the prior art location (i.e., shock limiter ring 218, FIG. 2) at the end of the shaft.

Figure 3:
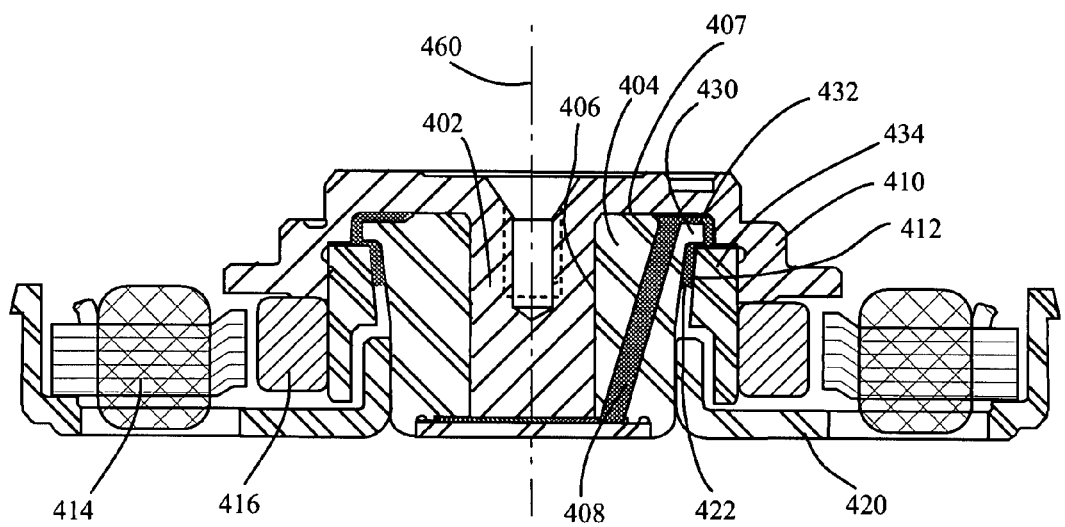
FIG. 3 is a sectional side view of a hydrodynamic bearing spindle motor used in a disc drive data storage system, illustrating a limiter relocated to outboard of a thrust bearing, in accordance with an embodiment of the present invention.

FIG. 3 is a sectional side view of a hydrodynamic bearing spindle motor used in a disc drive data storage system 110, illustrating a limiter 430 relocated to outboard of the thrust bearing 407, in accordance with an embodiment of the present invention. Rather than utilizing a shock limiter ring 218 attached to the bottom end of the shaft 402, as in the motor structure described in FIG. 2 above, the present invention embodiment employs limiter 430 and limiter bushing 434 together to limit axial displacement of the relatively rotatable inner and outer components. In this present invention embodiment example motor structure, the rotating components include shaft 402, hub 410, limiter bushing 434, and magnet 416. The stationary components include sleeve 404, limiter 430, base plate 420 and stator 414. A journal bearing 406 containing fluid is defined between surfaces of the shaft 402 and the sleeve 404, wherein the shaft 402 and the sleeve 404 are positioned for relative rotation. Further, a fluid recirculation path 408 is additionally formed through sleeve 404 to pass and recirculate fluid through journal bearing 406 and thrust bearing 407, the fluid recirculation path 408 being in fluid communication with the fluid channel 432. Fluid recirculation path 408 also facilitates purging air from bearings 406 and 407 via reservoir 412 contained on an end by seal meniscus 422. Although a journal bearing 406 is shown in FIG. 3, the present invention can be utilized with, and benefit, other bearings including other hydrodynamic bearings, and conical bearings.

A limiter located outboard of a thrust bearing is utilized in some contemporary motor designs. As more fully illustrated and described below with reference to FIGS. 7A-7C, the outboard limiter in these contemporary designs creates a risk of trapping air inside the motor. The present invention, however, includes features to purge air and avoid air entrapment, as detailed below. One such feature, a slot (i.e., slot 436), is present, although not visible in FIG. 3. Slot 436 is described in FIGS. 5A and 5B infra.

Figure 4:
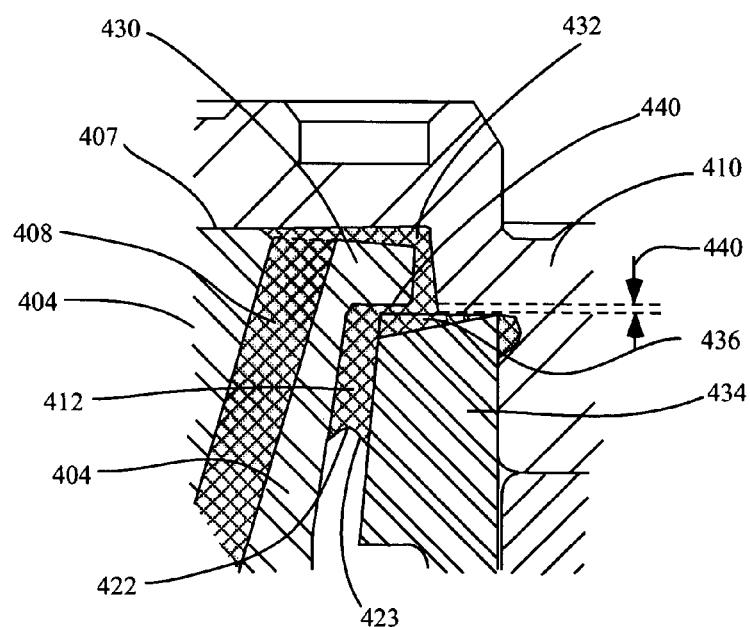
FIG. 4 is a sectional side view of an enlarged view of a portion of a hydrodynamic bearing spindle motor as in FIG. 3, illustrating a limiter situated adjacent to a limiter bushing defining an axial limiter gap therebetween, and a fluid channel that at least partially diverges as the fluid channel extends from the hydrodynamic bearing toward the region that is beyond the axial limiter gap, in accordance with an embodiment of the present invention.

FIG. 4 shows a sectional side view of an enlarged view of a portion of a hydrodynamic bearing spindle motor as in FIG. 3, in accordance with an embodiment of the present invention. As illustrated, a limiter 430 is situated adjacent to a limiter bushing 434 defining an axial limiter gap 440 therebetween. The limiter 430 and the limiter bushing 434 have radially overlapping (but not contacting) surfaces, in order to restrict axial movement or displacement of the relatively rotating components. Although the limiter 430 is shown affixed to the stationary components and the limiter bushing is shown affixed to the rotating components (shown in FIG. 3), the limiter can alternatively be fixed to a rotating component and the limiter bushing can be fixed to a stationary component. The axial limiter gap 440 also illustrates a slot 436, which is described in FIGS. 5A and 5B infra.

It is to be appreciated that the term "limiter bushing" as referred to herein can include other limiter facing surfaces or components that overlap or underlap with the limiter 430, besides a specific component as shown as limiter bushing 434. Likewise, these other limiter facing surfaces or components limit axial movement of an inner spindle motor component (i.e., shaft 402) with respect to an outer spindle motor component (i.e., sleeve 404).

A fluid channel 432 at least partially diverges as the fluid channel 432 extends from an outer diameter of thrust bearing 407 toward the region that is beyond the axial limiter gap 440 (i.e., fluid reservoir 412). In an embodiment, the fluid channel 432 is defined to include the fluid passageway beginning at an outer diameter of the thrust bearing 407 and extending to the fluid reservoir 412. In an alternative embodiment, a thrust bearing is not situated adjacent to the journal bearing 406 as shown in FIG. 4, and thus the fluid channel 432 (at least partially diverging) begins at the hydrodynamic bearing (FIG. 3, item 406), and extends to the fluid reservoir 412. The fluid channel 432 is thus defined to include the area of the axial limiter gap 440. In an embodiment, the entire length of fluid channel 432 continuously diverges as it extends from the journal bearing 406 (or thrust bearing 407) toward the region that is beyond the axial limiter gap. In an embodiment, the fluid channel 432 diverges at least at the location where it is in fluid communication with the fluid recirculation path 408. The region that is "beyond the axial limiter gap" is defined as the region including fluid reservoir 412. In an alternative embodiment, at least a portion of the fluid channel 432 diverges as it extends from the journal bearing 406 (or thrust bearing 407) toward the region that is beyond the axial limiter gap. In an embodiment, the fluid channel 432 does not converge as it extends from the journal bearing 406 (or thrust bearing 407) toward the region that is beyond the axial limiter gap, to allow any air to purge from the motor, as the fluid channel 432 extends to the region beyond the axial limiter gap. In a further embodiment, a portion of the fluid channel 432 diverges, and subsequently includes a constant width, as the fluid channel 432 extends toward the region beyond the axial limiter gap. In yet a further embodiment, a portion of the fluid channel 432 includes a constant width and subsequently diverges, as the fluid channel 432 extends toward the region beyond the axial limiter gap. In yet a further embodiment, the fluid channel 432 continuously diverges, except for the slot 436 portion which is shaped having a constant width.

The fluid within the motor includes a meniscus contained by a capillary seal 422. The capillary seal 422 may be situated between the limiter 430 and the limiter bushing 434, or between the sleeve 404 and the limiter bushing 434. FIG. 4 illustrates fluid contained within the fluid recirculation path 408 as well as fluid contained within fluid channel 432 and fluid reservoir 412, and as such the capillary seal 422 is shown situated between the sleeve 404 and the limiter bushing 434. The diverging fluid channel 432 allows the meniscus 423 ingress and egress through the fluid channel 432 without entrapping air behind the axial limiter gap 440, which would otherwise work against its passage back into the fluid reservoir 412 region where it would exit the motor. This is illustrated more fully in FIGS. 8A-8C infra.

Figures 5A, 5B:
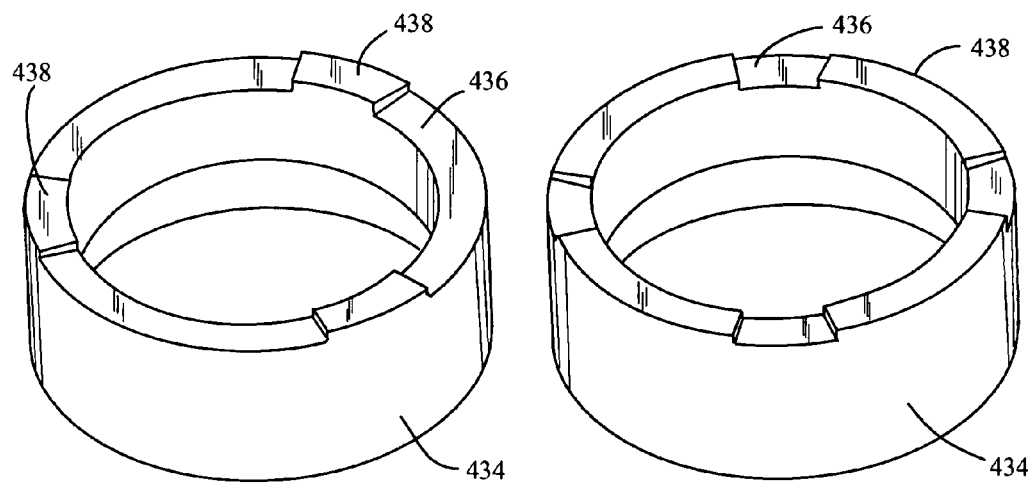
FIG. 5A is a perspective image of a limiter bushing illustrating slots and lands formed thereon, in accordance with an embodiment of the present invention.
FIG. 5B is another perspective image of a limiter bushing illustrating an alternative pattern of slots and lands formed thereon, in accordance with an embodiment of the present invention.

FIG. 5A shows a perspective image of a limiter bushing 434 illustrating slots 436 and lands 438 formed thereon, in accordance with an embodiment of the present invention. While three slots 436 are illustrated in FIG. 5A, other numbers of slots may be employed, including one slot, two slots or more than three slots. The slot 436 is formed in a facing surface adjacent to the axial limiter gap 440. The slot 436 can be formed in the limiter 430 or the limiter bushing 434. Alternatively, the slot 436 can be formed in both the limiter 430 and the limiter bushing 434.

In an embodiment, the slots 436 are formed having an axially diverging depth shaped in a direction as the fluid channel 432 extends toward the region beyond the axial limiter gap 440 (i.e., fluid reservoir 412). In an embodiment, the slots 436 are formed having a depth in the range of 80 microns to 200 microns. It is to be appreciated that the slots 436 axially diverge, and not the facing surfaces of the axial limiter gap 440. In an alternative embodiment, the slots 436 do not have an axially diverging depth shaped in a direction as the fluid channel 432 extends toward the region beyond the axial limiter gap 440, but rather at least a portion of the remainder of the fluid channel 432 diverges. In an embodiment, the depth of slots 436 reduces viscous drag losses, associated with the limiter gap, and thereby reduces power.

FIG. 5B is another perspective image of a limiter bushing illustrating an alternative pattern of slots and lands formed thereon. Here, four slots 436 are illustrated occupying a lesser area than the lands 438. The slots may occupy a lesser or a greater area than lands 438. In an alternative embodiment, the area of the slots 436 may be formed having varying lengths about the limiter bushing 434.

Figure 6A:
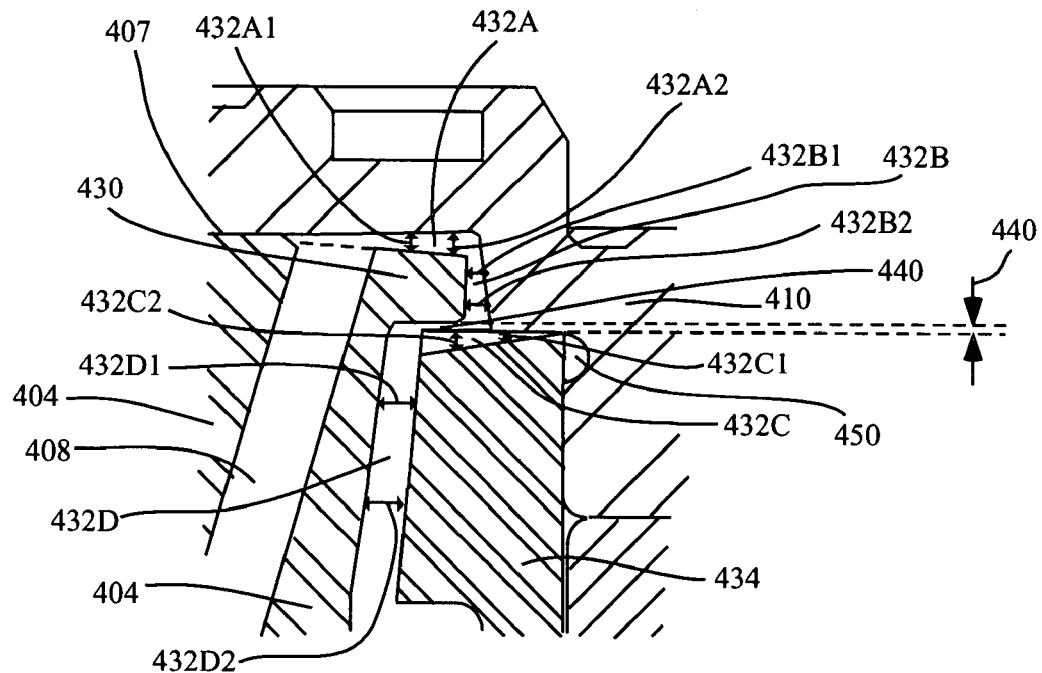
FIG. 6A is another sectional side view of an enlarged view of a portion of a hydrodynamic bearing spindle motor as in FIG. 3, illustrating a limiter, a limiter bushing, an axial limiter gap therebetween, and a fluid channel that diverges, in accordance with an embodiment of the present invention.

As illustrated in FIG. 6A, another sectional side view is shown of an enlarged view of a portion of a hydrodynamic bearing spindle motor as in FIG. 3, illustrating a limiter 430, a limiter bushing 434, an axial limiter gap 440 therebetween, and a fluid channel 432 that diverges, in accordance with an embodiment of the present invention. In this example, the limiter 430 includes three facing surfaces to define three principal gaps 432A, 432B, 432C with the fluid channel 432. A fourth principal gap 432D is defined between a surface of sleeve 404 and a second surface of the limiter bushing 434. The fluid channel includes first gap lengths 432A1 and 432A2 situated between a first surface of the limiter 430 and hub 410. The fluid channel also includes second gap lengths 432B1 and 432B2 situated between a second surface of the limiter 430 and the hub 410. The fluid channel further includes third gap lengths 432C1 and 432C2 situated within the slot 436. The fluid channel further includes fourth gap lengths 432D1 and 432D2 situated between a surface of sleeve 404 and a second surface of the limiter bushing 434.

In an embodiment, the second gap 432B is at least as wide as the first gap 432A, the gap 432C is at least as wide as the second gap 432B, and the fourth gap 432D is at least as wide as the gap 432C. Additionally, the first gap length 432A2 is at least as wide as the first gap length 432A1, the second gap length 432B2 is at least as wide as the second gap length 432B1, the third gap length 432C2 is at least as wide as the third gap length 432C1, and the fourth gap length 432D2 is at least as wide as the fourth gap length 432D1. In another embodiment, the fluid channel 432 continuously diverges, except at principal gap 432C. Here, slot 436 (FIG. 4) is shaped having a constant width (432C1=432C2).

Additionally, undercut 450 is shown at an outer radial diameter of the limiter bushing 434. The inclusion of undercut 450 is optional, and can be useful for manufacturing convenience or ease.

When the inner component of the motor is rotating relative to the outer component of the motor, then centripetal force causes air bubbles within principal gap 432A to move in a direction that is into the motor, rather than in a direction that would cause the bubbles to be purged from the motor. That is, when the motor is rotating, because of centripetal force, the air bubbles move from right to left in principal gap 432A (from the perspective when viewing FIG. 6A). However, as previously described, in an embodiment of the invention, when the channel at gap 432A diverges, then the bubbles are caused to move from left to right (from the perspective when viewing FIG. 6A) and eventually be purged from the motor. This is because the effect of the diverging channel on the air bubbles within gap 432A overcomes the centripetal force on the air bubbles.

In another embodiment of the invention, the principal gap 432A is structured such that gap 432A2 divided by the radius at 432A2 is greater than gap 432A1 divided by the radius at 432A1. That is, (gap 432A2/radius 432A2)>(gap 432A1/radius 432A1). This is hereinafter defined as equation 1. In an example, the "gap" is a distance between facing surfaces at a radius shown at the location of 432A2. The "radius" is the distance from 432A2 to the central axis of rotation of the motor (i.e., central axis 260, FIG. 2). Moreover, when gap 432A diverges according to equation 1, a negative shear gradient condition results, and air bubbles are forced in a direction from left to right (from the perspective when viewing FIG. 6A), for eventual purging from the motor. The negative shear gradient drives air bubbles to a lower energy state. This dynamic effect describes a reason that air bubbles with a diameter less than the channel gap, within which they are situated, are driven out of a diverging channel when the motor is rotating. An air bubble at a narrow end of a gap will experience a higher degree of distortion than an air bubble at a wider end, when the motor is rotating. The greater the shear distortion of the air bubble, the greater the energy stored in its surface. When the motor is rotating, the air bubble is consequently driven to a position where the stored energy is lessened (i.e., from left to right, from the perspective when viewing FIG. 6A).

In another embodiment, a fluid channel with a diverging gap having the structure of Equation 1 is applied to contemporary motor designs such as that shown in FIG. 2. Here, the motor does not necessarily include a limiter situated outboard of a thrust bearing, and also does not include a slot 436 adjacent to an axial limiter gap, as shown in FIG. 4.

Figure 6B:
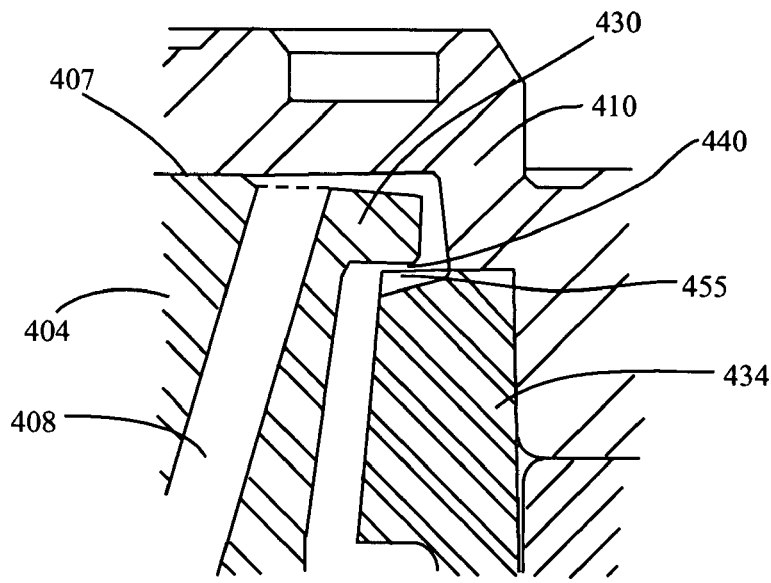
FIG. 6B is another sectional side view of an enlarged view of a portion of a hydrodynamic bearing spindle motor as in FIG. 3, illustrating a limiter, a limiter bushing, an axial limiter gap therebetween that is varied from that shown in FIG. 6A, and a fluid channel that diverges, in accordance with an embodiment of the present invention.

Referring to FIG. 6B, another sectional side view is illustrated of an enlarged view of a portion of a hydrodynamic bearing spindle motor as in FIG. 3. In this example, the slot gap 455 extends radially outward a lesser distance than the gap 432C in the example shown in FIG. 6A. In an embodiment, the slot gap 455 takes on an angle in the range of 2 to 15 degrees.

In addition, while the limiter 430 and the limiter bushing 434 are shown having distinct angles as the fluid channel 432 extends around corners, it is to be appreciated that the limiter 430 and the limiter bushing 434 may take on alternative shapes and surface lengths, provided that the axial movement or displacement of the relatively rotating components are restricted by the radially overlapping limiter 430 and underlapping limiter bushing 434.

Figure 7A:
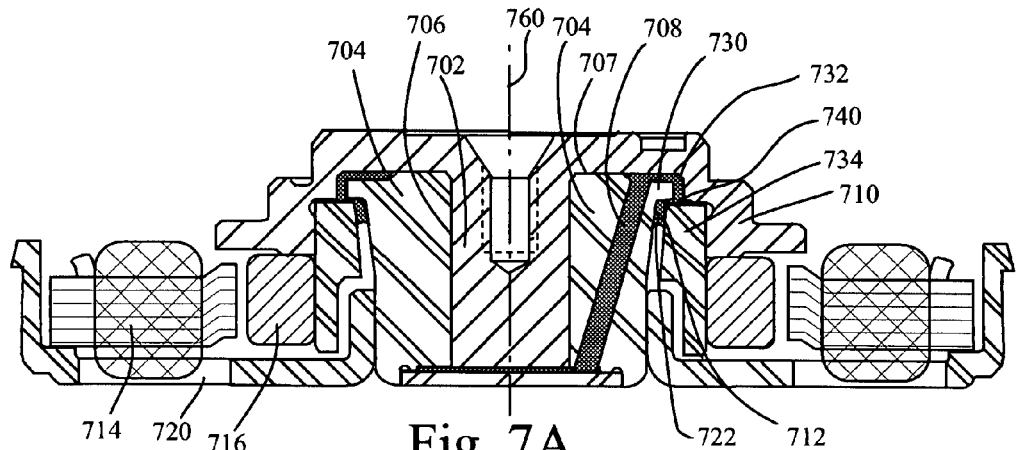
FIG. 7A is another sectional side view of a previously known hydrodynamic bearing spindle motor with a limiter situated outboard of a thrust bearing, illustrating a fluid volume that has become depleted from within the motor.
Figure 7B:
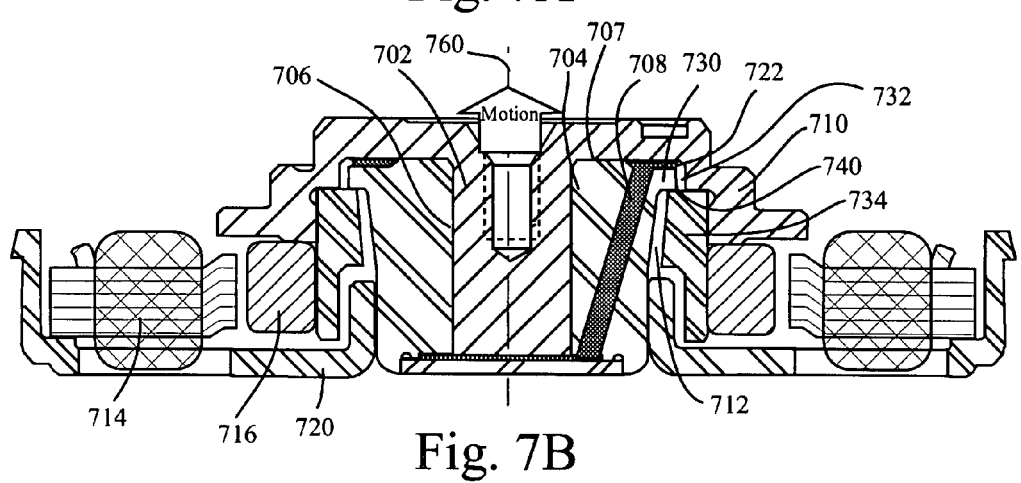
FIG. 7B is another sectional side view of the previously known hydrodynamic bearing spindle motor as in FIG. 7A with a limiter situated outboard of the thrust bearing, illustrating an effect on fluid positioning and a fluid meniscus when an axial motion or shock event occurs that forces the shaft up.
Figure 7C:
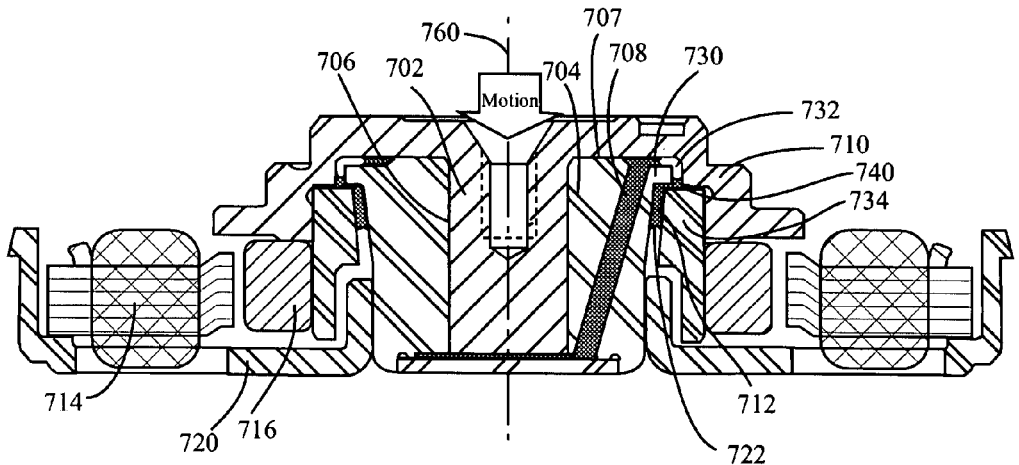
FIG. 7C is another sectional side view of the previously known hydrodynamic bearing spindle motor as in FIG. 7A with a limiter situated outboard of the thrust bearing, illustrating an effect on fluid positioning and a fluid meniscus when the axial gap narrows or closes following a shock event as in FIG. 7B, air becoming entrapped.

FIGS. 7A-7C show changing fluid volumes that can occur during the expected life and operation in a previously known hydrodynamic bearing spindle motor with a limiter 730 situated outboard of a thrust bearing.

FIG. 7A illustrates an example of a depleted fluid volume that can occur within a motor as described infra for reasons including evaporation. The depleted fluid volume is shown by fluid meniscus 722 being situated at the axial top of reservoir 712, which is further within the fluid channel 732 toward the hydrodynamic bearings 706 and 707.

FIG. 7B illustrates an effect on fluid positioning within fluid channel 732 and a fluid meniscus 722 when an axial motion or shock event occurs that forces the shaft 702 axially up and increasingly separates from the sleeve 704. Handling and shipping forces can produce enough axial motion to exceed the magnetic attraction force between the magnet 716 and base 720 and stator 714, thereby causing the axial play gap to open, or causing the axial displacement to increase beyond a desired or an acceptable range, between these relatively rotating components, namely hub 710 and sleeve 704. The path taken by fluid meniscus 722 is shown as it recedes to fill the volume within fluid channel 732 created within the bearing cavities by the axial displacement.

As shown, since the fluid volume was previously depleted (as shown in FIG. 7A), then the fluid recedes within the fluid channel 732 such that fluid is not present between axial limiter gap 740. This presents a situation of an insufficient fluid volume or lack of fluid between relatively rotating surfaces. The relatively rotating surfaces can thus directly contact. The dry contacting surfaces may lead to particle generation or gall and lock-up of the motor during contact. Particle generation and contamination of the bearing fluid may also result in reduced performance or failure of the spindle motor or disc drive components.

FIG. 7C illustrates an effect on fluid positioning within fluid channel 732 and a fluid meniscus 722 when the hub 710 repositions axially down and returns axially closer to sleeve 704, following a shock event as in FIG. 7B. Air can become trapped within the fluid channel 732, and in the example shown air is trapped between limiter 730 and hub 710. The air can subsequently relocate into the hydrodynamic bearing, causing complications including low thrust bearing fly height, increased wear, lubricant degradation, and/or motor seizure. Since the air crosses a narrow gap 740, by conditions shown in FIG. 7B, between the limiter 730 shoulder and limiter bushing 734, the air is unable to pass back through due to surface tension. It is to be appreciated that air may also become trapped within fluid channel 732 with or without a shock event. Air may also become trapped within fluid channel 732 whether or not fluid is depleted from the motor. Additionally, air may become trapped within fluid channel 732 due to handling during motor assembly. Further, once air is trapped inside the motor (because of an initial shock event and/or trapped air), the air may displace additional oil into the reservoir 708, which results in a higher fill volume in the reservoir 708. Consequently, if the reservoir 708 fluid volume is previously high, and a subsequent shock event occurs, the fluid can leak from the reservoir 708.

Figure 8A:
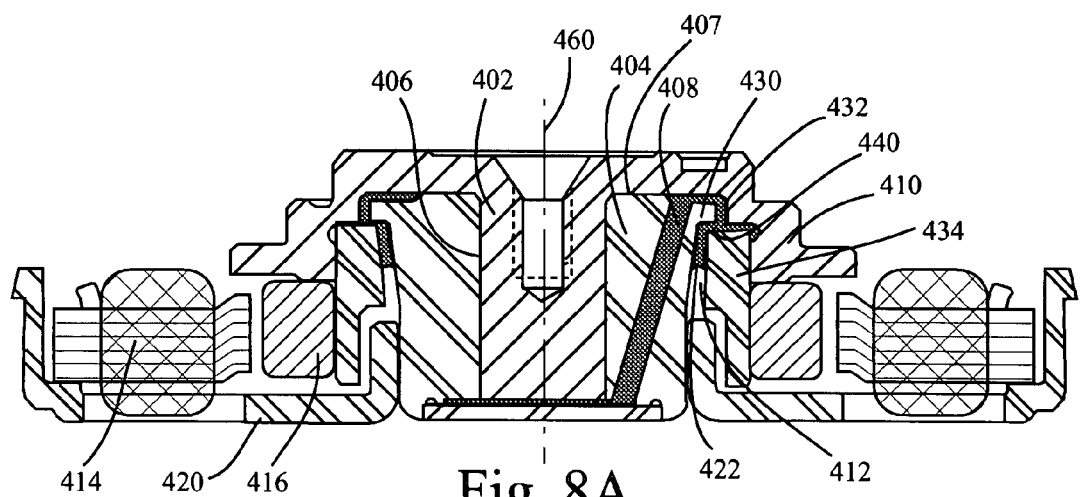
FIG. 8A is another sectional side view of the hydrodynamic bearing spindle motor as in FIG. 4 with a limiter situated outboard of a thrust bearing, illustrating a fluid volume depleted from a fluid reservoir.
Figure 8B:
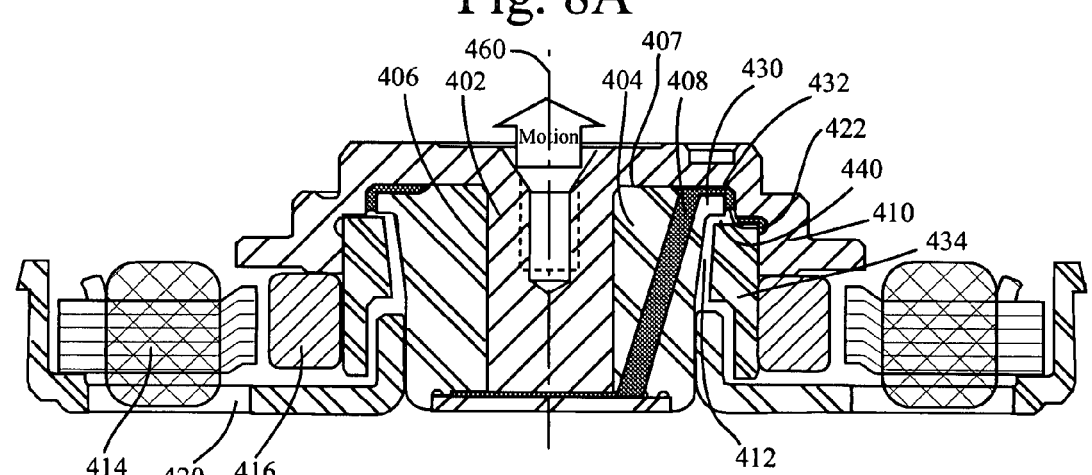
FIG. 8B is another sectional side view of the hydrodynamic bearing spindle motor as in FIG. 4 with a limiter situated outboard of the thrust bearing, illustrating an effect on fluid positioning and a fluid meniscus when an axial motion or shock event occurs that forces the shaft up.
Figure 8C:
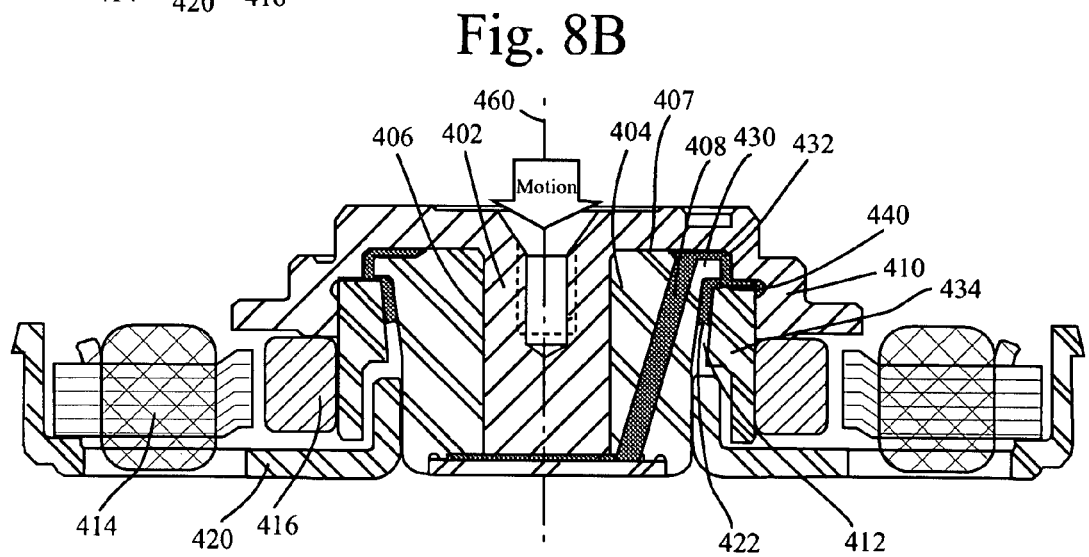
FIG. 8C is another sectional side view of the hydrodynamic bearing spindle motor as in FIG. 4 with a limiter situated outboard of the thrust bearing, illustrating an effect on fluid positioning and a fluid meniscus when the axial gap narrows or closes following a shock event as in FIG. 8B, air not becoming entrapped.

FIGS. 8A-8C show changing fluid volumes that can occur during the expected life and operation in a hydrodynamic bearing spindle motor as in FIG. 4.

Turning now to FIG. 8A, another sectional side view is shown of the hydrodynamic bearing spindle motor as in FIG. 4, illustrating a fluid volume within fluid reservoir 412. The fluid volume is shown by the positioning of fluid meniscus 422 within fluid reservoir 412. Again, the fluid volume can decrease within reservoir 412 as described infra for reasons including evaporation. When compared to the contemporary design shown in FIG. 7A, the fluid volume in FIG. 8A is fuller because of the additional area in the axially diverging slots 436 (shown in FIG. 5A). In an embodiment of the present invention, the additional fluid volume enables the use of lower viscosity oils. It should be noted that a lower viscosity lubricant may require additional reservoir lubricant volume since lower viscosity lubricants typically evaporate more rapidly. However, in contemporary designs, a larger lubricant volume presents a shock event risk at a lower shock event level, as described supra.

FIG. 8B illustrates an effect on fluid positioning within fluid channel 432 and a fluid meniscus 422 when an axial motion or shock event occurs that forces the hub 410 axially up and increasingly separates from the sleeve 404. Handling and shipping forces can produce enough axial motion to exceed the magnetic attraction force between the magnet 416 and base 420 and stator 414 of the motor, thereby causing the axial play gap to open, or causing the axial displacement to increase beyond a desired or an acceptable range, between these relatively rotating components, namely hub 410 and sleeve 404. The path taken by fluid meniscus 422 is shown as it recedes to fill the volume within fluid channel 432 created within the bearing cavities by the axial displacement. As shown, when the fluid recedes within the fluid channel 432 due to a shock event, a quantity of fluid remains within the axial limiter gap 440.

As illustrated in FIG. 8C, an effect on fluid positioning and air within fluid channel 432 and on fluid meniscus 422 is shown when the hub 410 repositions axially down and returns axially closer to sleeve 404, following a shock event as in FIG. 8B. Air can escape from within the fluid channel 432. In the embodiment described above wherein the fluid channel 432 axially diverges, any air bubbles move toward larger gaps to achieve a lowest energy state, and therefore any air is purged from the motor from the fluid meniscus 423. In an alternative embodiment as previously described wherein the slot 436 does not axially diverge, then air may temporarily collect at slot 436 until the motor resumes rotation, and then upon motor rotation, the air will be forced toward gap 432D (see FIG. 6A, supra) via centrifugal force and purged out the fluid meniscus 423.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

We claim:

1. A system comprising:
   a limiter adjacent to a limiter facing surface defining an axial limiter gap therebetween, the limiter adjoining one of a rotatable component and a stationary component, and the limiter facing surface adjoining the other of one of the rotatable component and the at least one stationary component;
   a channel defined between the rotatable component and the stationary component and extending from hydrodynamic bearing to the axial limiter gap and continuing to a region beyond the axial limiter gap, wherein at least a portion of the channel diverges as the channel extends from the hydrodynamic bearing toward the region that is beyond the axial limiter gap; and
   at least one slot at the axial limiter gap, defined by at least one of the limiter and the limiter facing surface, wherein the at least one slot has a diverging depth as the channel extends toward the region beyond the axial limiter gap.

2. The system as in claim 1, wherein the channel diverges and subsequently includes a constant width.

3. The system as in claim 1, wherein the channel includes a constant width and subsequently diverges, as the channel extends toward the region beyond the axial limiter gap.

4. The system as in claim 1, wherein the channel includes:
   a first gap situated between a first surface of the limiter and a facing surface of the rotatable component or the stationary component;
   a second gap situated between a second surface of the limiter and the facing surface of the stationary component or the stationary component;
   the at least one diverging slot; and
   a third gap situated between a sleeve surface and a second surface of the limiter facing surface, wherein the second gap is at least as wide as the first gap, the at least one diverging slot is at least as wide as the second gap, and the third gap is at least as wide as the at least one diverging slot.

5. The system as in claim 1, wherein the channel defines a first location and a second location, wherein the second location is closer to the region that is beyond the axial limiter gap as compared with the first location, and wherein the channel diverges according to: a gap of the second location divided by a radius at the second location that is greater than a gap of the first location divided by a radius at the first location.

6. The system as in claim 5, wherein the channel at the first location and the second location extends in a radial direction, as the channel extends from the hydrodynamic bearing toward the region that is beyond the axial limiter gap.

7. The system as in claim 1, wherein the slot depth is in the range of 80 microns to 200 microns.

8. The system as in claim 1, wherein the region beyond the axial limiter gap forms a reservoir.

9. The system as in claim 1, wherein one of the rotatable component and the stationary component further defines a fluid recirculation passageway therethrough for recirculating fluid about the hydrodynamic bearing, the fluid recirculation passageway is in fluid communication with the channel.

10. The system as in claim 1, wherein the rotatable component is a shaft, the stationary component is a sleeve, and the limiter facing surface is a limiter bushing surface.

11. In a system having a hydrodynamic bearing defined between at least one rotatable component and at least one stationary component, wherein the at least one rotatable component and the least one stationary component are positioned for relative rotation, a method comprising:

situating a limiter adjacent to a limiter facing surface and defining an axial limiter gap therebetween for limiting axial movement of the at least one rotatable component with respect to the at least one stationary component, the limiter adjoining one of the at least one rotatable component and the at least one stationary component, and the limiter facing surface adjoining one of the at least one rotatable component and the at least one stationary component;

defining a channel between the at least one rotatable component and the at least one stationary component and extending from the hydrodynamic bearing to the axial limiter gap and continuing to a region beyond the axial limiter gap, wherein at least a portion of the channel diverges as the channel extends from the hydrodynamic bearing toward the region that is beyond the axial limiter gap;

defining at least one slot at the axial limiter gap, defined by at least one of the limiter and the limiter facing surface; and shaping the at least one slot with a diverging depth as the channel extends toward the region beyond the axial limiter gap.

12. The method as in claim 11, wherein the channel diverges and subsequently includes a constant width.

13. The method as in claim 11, wherein the channel includes a constant width and subsequently diverges, as the channel extends toward the region beyond the axial limiter gap.

14. The method as in claim 11, wherein the channel defines a first location and a second location, wherein the second location is closer to the region that is beyond the axial limiter gap as compared with the first location, and wherein the channel diverges according to: a gap of the second location divided by a radius at the second location is greater than a gap of the first location divided by a radius at the first location.

15. The method as in claim 14, wherein the fluid channel at the first location and the second location extends in a radial direction, as the channel extends from the hydrodynamic bearing toward the region that is beyond the axial limiter gap.

16. The method as in claim 11, wherein the region beyond the axial limiter gap forms a reservoir, and wherein one of the at least one rotatable component and the at least one stationary component further defines a fluid recirculation passageway therethrough for recirculating fluid about the hydrodynamic bearing, the fluid recirculation passageway in fluid communication with the channel.

* * * * *